April 23, 1963   G. H. HAMLIN, JR., ET AL   3,086,298
INFORMATION DISSEMINATION APPARATUS
Filed Oct. 20, 1959

INVENTORS.
GEORGE H. HAMLIN, JR.
SAMUEL K. HART
ARNOLD J. KREISMAN
JOHN L. MARSH, JR.
CHARLES H. SNYDER

ATTORNEY

United States Patent Office 3,086,298
Patented Apr. 23, 1963

3,086,298
INFORMATION DISSEMINATION APPARATUS
George H. Hamlin, Jr., Roslyn, Samuel K. Hart, Elkins Park, Arnold J. Kreisman, Wyndmoor, John L. Marsh, Jr., Cheltenham, and Charles H. Snyder, Philadelphia, Pa., assignors, by mesne assignments, to Aero Service Corporation, a corporation of Delaware
Filed Oct. 20, 1959, Ser. No. 847,560
2 Claims. (Cl. 35—41)

This invention relates to the dissemination of information and is particularly directed to apparatus adapted to contain the information in readily accessible status and in such manner as greatly to facilitate correlation of items carried by related but physically distinct components or elements of the apparatus.

For example, it may be embodied in apparatus comprising a relief map of a geographical entity and in the following disclosure it will be thus described to exemplify the type or kind of information correlation, whether related to a geographical entity or other subject matter, for which the apparatus is particularly designed.

In the map making field especially, it has been a customary practice to include at the map edges coordinate letters and numerals or other designations together with a separate sheet, pamphlet or the like containing a list, usually alphabetical, of place names with their respective coordinates related to those on the map whereby the several places may be located on the map by reference to the marginal coordinate designations set forth in the list. These supplementary publications, commonly designated gazetteers, often become separated and misplaced or lost, or even if preserved in an accessible location are by their nature susceptible of deterioration through normal wear and tear long before the map, which in use is handled relatively little, shows any sign of damage from this cause with the result that maps in good condition have sometimes had to be discarded as inadequate because of loss or unserviceability of the gazetteer necessary to enable them to be used most effectively for reference, instruction or the like.

It is therefore a principal object of the invention to provide a unitary apparatus embodying a map, chart or other two or three dimensional representation with which is permanently and accessibly associated suitably arranged items of assembled information related to details of the subject matter represented on the map whereby deterioration or separation of the element carrying the information is minimized and its availability to facilitate reference to and to supplement that carried by the map is enhanced and prolonged.

Other objects, purposes and advantages of the invention will be understood or will more fully appear from the following description of apparatus embodying it, which for convenience is rendered as a relief map of continental United States with an associated panel or sheet suitable for reception of assembled information relating thereto as illustrated in the accompanying drawing in which.

Figure 1:
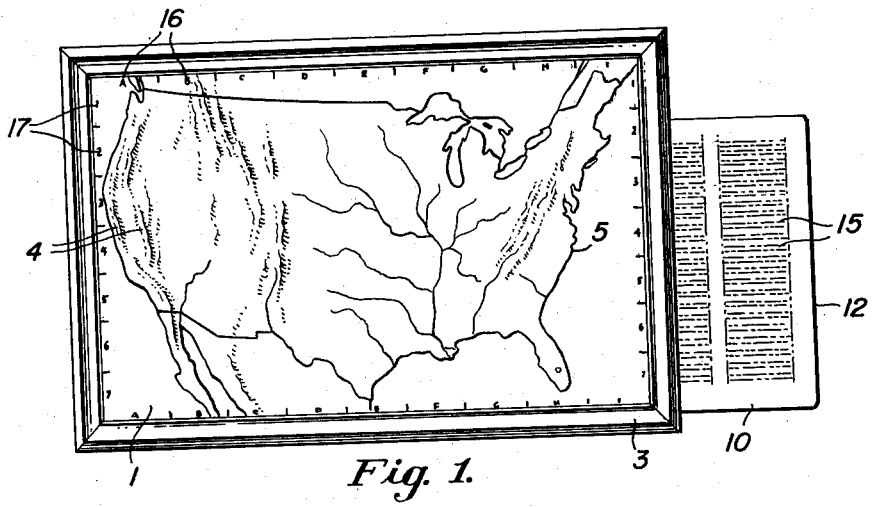
FIG. 1 is a front elevation of the map diagrammatically illustrating the panel as partially extended to give access to information it contains.
Figure 2:
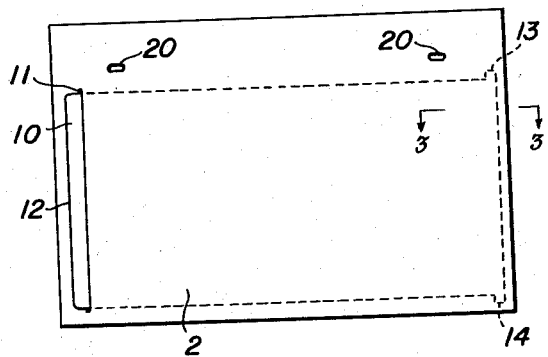
FIG. 2 is a rear elevation of the same apparatus with the panel telescoped within its back cover.
Figure 3:
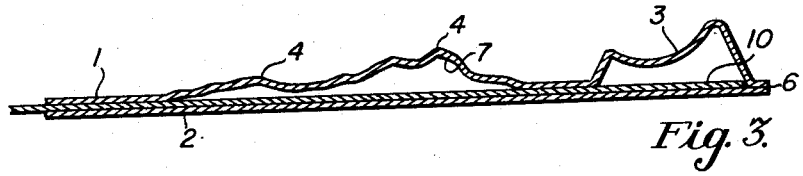
FIG. 3 is an enlarged sectional detail on line 3—3 in FIG. 2.
Figure 4:
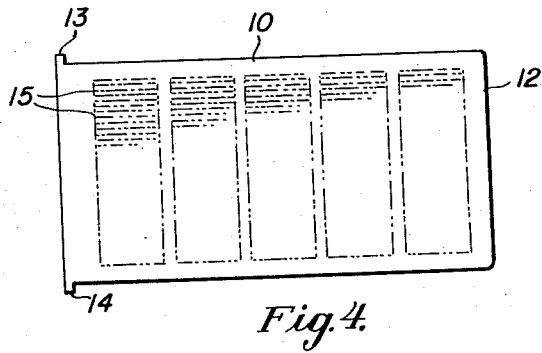
FIG. 4 is a diagrammatic front elevation of said panel separated from the map.

Referring now more particularly to the drawing, which as indicated is to be considered as representing but a typical embodiment of the invention, the latter comprises complementary sheets 1, 2 preferably formed of relatively rigid deformable sheet material such as synthetic vinylchloride or other suitable material among which may be mentioned thermoplastic and thermosetting synthetics, lacquered paper and in general any material which in sheet form, preferably at about .015" thickness is capable of being formed or treated to retain a stable configuration and maintain the desired rigidity.

The outer sheet 1 is marginally shaped, by an appropriate forming process usually under heat and pressure, to present an integral decorative frame 3 which in addition to affording an aesthetic finish to its appearance imparts rigidity to the sheet as a whole, particularly at its edges which lie in a common plane and comprehend a substantially continuous peripheral transversely displaced portion integral with and disposed in offset relation to the remainder of the sheet. In the same operation as that in which the frame 3 is formed, or separately if preferred, configuration in relief representing geological formations such as mountains 4 may be expressed from the usually pre-printed sheet at positions on the latter corresponding to their actual locations in the geographical entity represented by the map 5 displayed on the exposed face of the sheet. It will be understood that because of scale it is impractical to reproduce in the drawing the names of geographical subdivisions normally appearing on maps of this character, or political boundary lines such as the borders of states, although these are usually supplied when an operative embodiment of the invention comprises a map.

The rear sheet 2 is secured at its peripheral edges to sheet 1 as by "welding" 6 with the aid of heat and pressure to provide between the sheets an enclosed space 7 within which a gazetteer panel 10 is slidable. This panel, which may be made of sheet material of the same type and thickness as is used for sheets 1, 2 is inserted between the latter through a slot 11 in sheet 2 in such manner that when the panel is fully seated in space 7 its edge 12 projects beyond the slot sufficiently to permit its manipulation to slide the panel to and fro in the slot as desired, being concealed from the front of the map when fully seated therein while ears 13, 14 on the inner end of the panel extend laterally outwardly therefrom more widely than the ends of the slot to engage the latter and prevent inadvertent complete withdrawal of the panel from between sheets 1, 2 when it is extended.

Panel 10 carries on its front face printed material represented by lines 15 in the drawing which may compose a gazetteer comprising alphabetical lists of political, geographical or geological entities or the like shown on the map together with coordinate data whereby through reference to map coordinates such as letters 16 extending horizontally and numerals 17 extending vertically the coordinates set forth in the tables formed by lines 15 can be correlated with the map to locate on the latter the geographical entity being sought. Of course information other than coordinates on the map may be contained in the tables on panel 10, for example the population of cities, area of states, height of mountains and the like whereby the apparatus may partake of some of the characteristics of a geographical encyclopaedia with added characteristics of visual aids, especially when including a relief map in which relative elevations or altitudes are usually portrayed with considerable exaggeration as compared with the linear scale in all but the very largest scale maps.

The apparatus illustrated is designed to be suspended from a wall or other vertical support when in use and to facilitate this spaced slotted apertures 20 in rear sheet 2 may be provided for the reception of supports (not shown) which, especially if of the common metal strip picture hook type, may extend into the space between panel 10 and sheet 2 without interfering with the movement of the former in and out of slot 11.

While we have herein described our invention with considerable particularity as embodied in a relief map and associated geographical gazetteer it will be understood we do not desire or intend to be thereby limited or confined in any way as like principles may be utilized with similar results when the apparatus comprises a two-dimensional map, chart or the like as well as a three-dimensional one and that charts and displays with correlated information relating to subjects wholly distinct from geography may be contained thereon and therein if preferred and changes and modifications in the form, structure, arrangement and relationship of the several parts will readily occur to those skilled in the art and may be utilized without departing from the spirit and scope of the invention as defined in the appended claims.

Having thus described our invention, we claim and desire to protect by Letters Patent of the United States:

1. A three-dimensional contoured display picture comprising a thin upper sheet, a thin backing sheet, and a middle sheet slidably disposed between the upper and lower sheets, said upper sheet having its central portions contoured in relief representing the three dimensional picture desired and having a raised border contour located slightly inward from the periphery to reinforce the upper sheet against bending and to provide an integral frame about the relief picture, the edges of the upper sheet about the periphery of the upper sheet displaced transversely below all other portions of the sheet and engaging with the backing sheet, whereby all portions of the upper sheet are spaced from the backing sheet except the engaging edges thereof, said middle sheet having a retaining tab at one end thereof and said backing sheet having a slot disposed substantially parallel to and offset from one edge thereof to slidably receive the middle sheet for sliding movement in the space provided between the upper sheet and backing sheet but said slot being of insufficient length to permit the passage of the outstanding tab on the middle sheet from passing therethrough, said slot in the backing sheet providing guidance for the edges of the middle sheet permitting only sliding movement of the middle sheet between the upper sheet and the backing sheet, and said middle sheet having a portion of its surface continuously disposed beneath a depressed portion of the upper sheet located slightly inward of the raised border, thereby to provide guidance along a different edge of said middle sheet and prevent movements of said middle sheet at said different edge other than sliding relative to said upper and backing sheets, said middle sheet containing spaced indicia pertaining to the relief portions of the upper sheet.

2. Apparatus as in claim 1 in which said upper sheet comprises a relief map of a geographical entity and the data on said second sheet comprises indicia related to the geographical entity.

References Cited in the file of this patent

UNITED STATES PATENTS

| | | |
|---|---|---|
| 1,656,673 | Haugen | Jan. 17, 1928 |
| 1,864,022 | Jewell | June 21, 1932 |
| 2,373,258 | Olsen | Apr. 10, 1945 |

FOREIGN PATENTS

| | | |
|---|---|---|
| 302,828 | Italy | Nov. 9, 1932 |
| 612,403 | Germany | Nov. 6, 1932 |
| 742,937 | Great Britain | Jan. 4, 1956 |